United States Patent
Ohkita et al.

(10) Patent No.: US 7,482,412 B2
(45) Date of Patent: Jan. 27, 2009

(54) PROCESS FOR MANUFACTURING CYCLOOLEFIN ADDITION POLYMER

(75) Inventors: Kenzo Ohkita, Tokyo (JP); Nobuyuki Sakabe, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 11/869,221

(22) Filed: Oct. 9, 2007

(65) Prior Publication Data

US 2008/0085979 A1    Apr. 10, 2008

(30) Foreign Application Priority Data

Oct. 10, 2006    (JP)    ............................. 2006-276638

(51) Int. Cl.
 *C08F 2/38*    (2006.01)
 *C08F 32/04*    (2006.01)
(52) U.S. Cl. .................... 526/87; 526/131; 526/134; 526/172; 526/279; 526/281
(58) Field of Classification Search ............... 526/87, 526/281, 131, 134, 172, 279; 525/289
See application file for complete search history.

(56) References Cited

U.S. PATENT DOCUMENTS

| 5,929,181 | A | * | 7/1999 | Makovetsky et al. | ........ 526/171 |
| 2007/0123667 | A1 | * | 5/2007 | Oshima et al. | ............... 526/171 |

* cited by examiner

*Primary Examiner*—Fred M Teskin
(74) *Attorney, Agent, or Firm*—Oblon, Spivak, McClelland, Maier & Neustadt, P.C.

(57) ABSTRACT

A process for manufacturing a cycloolefin addition polymer includes polymerizing monomers containing a cycloolefin compound using a catalyst containing a nickel compound or a palladium compound by addition polymerization in the presence of a molecular weight controlling agent in two steps, that is a step of a initiating the polymerization reaction using the monomers in an amount of not more than 80 wt % of the total monomers and a step of supplying the remaining monomers to the reaction system during the polymerization reaction. A cycloolefin addition polymer with a uniform quality, having a narrow molecular weight distribution and a controlled molecular weight, and excellently balanced processability and mechanical strength can be obtained at a high polymerization conversion rate using the process. The process can be operated at a highly controlled polymerization temperature, and is thus suitable for industrially manufacturing a cycloolefin addition polymer.

24 Claims, No Drawings

PROCESS FOR MANUFACTURING CYCLOOLEFIN ADDITION POLYMER

BACKGROUND OF THE INVENTION

1. Field of the Invention

The present invention relates to a process for manufacturing a cycloolefin addition polymer. More particularly, the present invention relates to a process for manufacturing a cycloolefin addition polymer having a narrow molecular weight distribution and a controlled molecular weight. The process can achieve a high polymerization conversion rate and is suitable for industrially manufacturing the cycloolefin addition polymer.

2. Description of Related Art

Polymers formed from a structural unit which mainly originates from cycloolefin compounds are manufactured by using a catalyst containing a metal compound component of a metal belonging to Group 10 such as nickel and palladium. These polymers are known as resins having outstanding heat resistance and transparency. It has been reported that a cycloolefin addition polymer exhibiting high polymerization activity and possessing outstanding transparency, heat resistance, and mechanical strength can be manufactured by using a specific catalyst containing in particular a palladium compound. See JP-A-2006-52347, JP-A-2005-162990 and JP-A-2005-213435.

JP-A-2005-48060 discloses a crosslinked product of cycloolefin addition copolymer containing a hydrolyzable silyl group-containing cycloolefin, which can be produced by using a catalyst containing a palladium compound, and possesses excellent heat resistance, mechanical strength, and dimensional stability. In order to exhibit such performance, the cycloolefin addition copolymer must have sufficiently reduced compositional distribution. To this end, a method of introducing a part of hydrolyzable silyl group-containing cycloolefin during the polymerization reaction and a continuous polymerization process have been proposed. However, the document discloses neither a method and effect of obtaining a polymer with a narrow molecular weight distribution, nor a method of easily controlling the polymerization temperature. In addition, the disclosed technology is applicable only to hydrolyzable silyl group-containing cycloolefin copolymers.

Since the molecular weight of a cycloolefin addition copolymer significantly affects the solubility in solvent, solution viscosity, melting behavior, mechanical strength, and the like, it is important to control the molecular weight in an optimal range according to the application and molding method. As a method for controlling the molecular weight, for example, a method of adding a 1-alkene and an aromatic vinyl compound as a molecular weight controlling agent has been disclosed, and a mechanism of inserting a double bond into a metal-carbon bond and beta-hydrogen dissociation which follows the double bond insertion has also been proposed. See JP-A-2005-162990, JP-T-9-508649 And JP-A-2003-40929. In contrast, no considerable attention has been given to the molecular weight distribution of a cycloolefin addition copolymer. Many manufacturing processes produce low molecular weight components. Since low molecular weight components included in a polymer may degrade mechanical strength and heat resistance, sufficient reduction of the low molecular weight components is often desired. As an example of related art giving attention to the molecular weight distribution, a method of manufacturing a norbornene-based cycloolefin addition polymer in which the molecular weight and the molecular weight distribution are controlled by the addition of a non-conjugated cyclopolyene has been disclosed, see JP-A-2002-212209. However, the non-conjugated cyclopolyene firmly coordinates with a transition metal compound, which may result in lowering polymerization activity.

On the other hand, the polymerization temperature largely affects the reaction rate, life of active seeds, and properties of polymers. For example, if the polymerization temperature is too high, the catalyst may be deactivated, resulting in an insufficient conversion rate. If the polymerization temperature is too low, the productivity may unduly decrease. In addition, a temperature variation may affect the molecular weight and the like. If the control range is too wide, uniformity of the polymer may be impaired. Since a decrease of the specific surface area of the reactor due to the increase in the reactor capacity gives rise to reduction of cooling efficiency of the polymerization system, effective removal of heat and control exothermic heat are important subjects in controlling the reaction temperature. In order to increase economy in industrial production and to maintain the product quality, a process for manufacturing cycloolefin addition copolymers with excellent temperature control has been desired.

However, a process for manufacturing a cycloolefin addition copolymer which can attain narrow molecular weight distribution, can allow easy control of the polymerization temperature, and is particularly suitable for industrial production has not been reported up to now.

The processes for manufacturing cycloolefin addition polymers presently used have a problem of producing a large amount of low molecular weight components, particularly when a high conversion rate is pursued.

SUMMARY OF THE INVENTION

As described above, the processes for manufacturing cycloolefin addition polymers presently used have a problem of producing a large amount of low molecular weight components, particularly when a high conversion rate is pursued. In view of this situation, the inventors of the present invention have conducted extensive studies and, as a result, have found that the low molecular weight components included in a cycloolefin addition polymer are produced due to the difference of reactivity between cycloolefin compounds and a molecular weight controlling agent. That is, because the reaction rate of the molecular weight controlling agent is extremely small as compared with that of the monomers, the molecular weight controlling agent which has not been consumed exists in an excess amount in the later stage of the polymerization.

An object of the present invention is to solve such a problem and to provide a process for manufacturing a cycloolefin addition polymer with a uniform quality, having a narrow molecular weight distribution and a controlled molecular weight, and excellently balanced processability and mechanical strength, which can achieve a high polymerization conversion rate, of which the polymerization temperature is excellently controlled, and which is suitable for industrially manufacturing the cycloolefin addition polymer.

The process for manufacturing a cycloolefin addition polymer of the present invention comprises polymerizing monomers containing a cycloolefin compound shown by the following formula (1) using a catalyst containing a nickel compound or a palladium compound by addition polymerization in the presence of a molecular weight controlling agent, the process comprising a step of initiating the polymerization reaction using the monomers in an amount of not more than 80 wt % of the total monomers and a step of supplying the remaining monomers to the reaction system during the polymerization reaction,

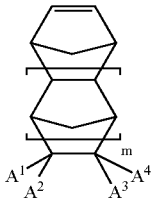
(1)

wherein $A^1$ to $A^4$ individually represent a hydrogen atom, a hydrocarbon group having 1 to 20 carbon atoms, a hydrocarbon group containing an oxygen atom or a nitrogen atom and having 1 to 20 carbon atoms, a trialkylsilyl group having 3 to 12 carbon atoms, or a hydrolyzable silyl group having 0 to 12 carbon atoms, and in is 0 or 1.

Thus, in one embodiment, the present invention provides a process for manufacturing a cycloolefin addition polymer, comprising:

initiating polymerization with at most 80 wt % of a total amount of a monomer composition comprising at least one cycloolefin compound represented by formula (1):

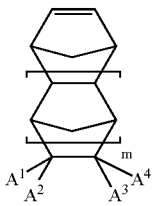
(1)

wherein $A^1$ to $A^4$ each, independently, represent a hydrogen atom, a hydrocarbon group having 1 to 20 carbon atoms, a hydrocarbon group containing an oxygen atom or a nitrogen atom and having 1 to 20 carbon atoms, a trialkylsilyl group having 3 to 12 carbon atoms, or a hydrolyzable silyl group having 0 to 12 carbon atoms, and m is 0 or 1, in the presence of a catalyst comprising at least one of a nickel compound or a palladium compound and at least one molecular weight controlling agent, and then adding the remaining amount of the monomer composition during the polymerization.

In the process for manufacturing a cycloolefin addition polymer according to the present invention, the polymerization reaction is preferably a continuous polymerization reaction and the conversion rate is preferably 97% or more.

In the process for manufacturing a cycloolefin addition polymer according to the present invention, the molecular weight controlling agent is preferably a 1-alkene compound.

In the process for manufacturing a cycloolefin addition polymer according to the present invention, the monomers preferably contain at least one compound selected from the group consisting of bicyclo[2.2.1]hept-2-ene and 5-alkylbicyclo[2.2.1]hept-2-enes having an alkyl group with 1 to 12 carbon atoms in an amount of 90 mol % or more. In the process for manufacturing a cycloolefin addition polymer according to the present invention, the monomers preferably contain at least one compound selected from the group consisting of 5-butylbicyclo[2.2.1]hept-2-ene, 5-hexylbicyclo[2.2.1]hept-2-ene, 5-octylbicyclo[2.2.1]hept-2-ene, and 5-decylbicyclo[2.2.1]hept-2-ene.

In the process for manufacturing a cyclic olefin addition copolymer of the present invention, the catalyst is preferably a catalyst obtained by using the following components (a), (b), and (d), or a catalyst obtained by using the following components (c) and (d), (a) an organic acid salt of palladium or a beta-diketonate compound of palladium, (b) a phosphine compound shown by the following formula (b), $$P(R^1)_2(R^2) \tag{b}$$

wherein $R^1$ represents a group selected from a cyclopentyl group, a cyclohexyl group, and an isopropyl group, and $R^2$ represents a hydrocarbon group having 3 to 10 carbon atoms, (c) a phosphine complex of divalent palladium shown by the following formula (c), $$Pd[P(R^1)_2(R^2)]_n X_2 \tag{c}$$

wherein $R^1$ represents a group selected from a cyclopentyl group, a cyclohexyl group, and an isopropyl group, and $R^2$ represents a hydrocarbon group having 3 to 10 carbon atoms, X is an organic acid anion or a beta-diketonate anion, and n is 1 or 2, and (d) an ionic boron compound.

In the process for manufacturing a cycloolefin addition polymer according to the present invention, the phosphine compound (b) is preferably tricyclopentyl phosphine or tricyclohexyl phosphine.

In the process for manufacturing a cycloolefin addition polymer according to the present invention, the phosphine complex of divalent palladium (c) is preferably a complex of palladium and a tricyclopentylphosphine or a complex of palladium and tricyclohexylphosphine.

In the process for manufacturing a cyclic olefin addition copolymer of the present invention, the ionic boron compound (d) is preferably a compound consisting of a carbenium cation and a tetrakis(pentafluorophenyl)borate anion or a tetrakis(perfluoroalkylphenyl)borate anion.

According to the present invention, a process for manufacturing a cycloolefin addition polymer with a uniform quality, having a narrow molecular weight distribution and a controlled molecular weight, and excellently balanced processability and mechanical strength, which can achieve a high polymerization conversion rate, of which the polymerization temperature is excellently controlled, and which is suitable for industrially manufacturing the cycloolefin addition polymer, can be provided. The cycloolefin addition polymer obtained by the process of the present invention has outstanding transparency and heat resistance, and can be suitably used for various optical materials, electrical and electronic parts, medical application substrates, and the like.

DETAILED DESCRIPTION OF THE INVENTION

The present invention is described in detail hereinafter. The term "polymerization" as used herein refers to polymerization or copolymerization, and the terms "monomer" and "monomer composition" refers one monomer compound or two or more such compounds, unless noted otherwise. Thus, the process of the present invention may be conducted with one monomer or a mixture of two or more monomers.

<Monomer>

In the process for manufacturing a cycloolefin addition polymer according to the present invention, the monomer contains at least one compound represented by formula (1) shown above. As specific examples of the cycloolefin compound shown by the above formula (1), the following compounds can used.

Unsubstituted Cycloolefin or Cycloolefin Substituted with a Hydrocarbon
bicyclo[2.2.1]hept-2-ene,
5-methylbicyclo[2.2.1]hept-2-ene,
5-ethylbicyclo[2.2.1]hept-2-ene,
5-butylbicyclo[2.2.1]hept-2-ene,
5-hexylbicyclo[2.2.1]hept-2-ene,
5-octylbicyclo[2.2.1]hept-2-ene,
5-decylbicyclo[2.2.1]hept-2-ene,
5-dodecylbicyclo[2.2.1]hept-2-ene,
5,6-dimethylbicyclo[2.2.1]hept-2-ene,
5-methyl-6-ethylbicyclo[2.2.1]hept-2-ene,
5-cyclohexylbicyclo[2.2.1]hept-2-ene,
5-phenylbicyclo[2.2.1]hept-2-ene,
5-benzylbicyclo[2.2.1]hept-2-ene,
5-indanylbicyclo[2.2.1]hept-2-ene,
5-vinylbicyclo[2.2.1]hept-2-ene,
5-vinylidenebicyclo[2.2.1]hept-2-ene,
5-(1-butenyl)bicyclo[2.2.1]hept-2-ene,
tricyclo[5.2.1.0$^{2,6}$]dec-8-ene,
3-methyltricyclo[5.2.1.0$^{2,6}$]dec-8-ene,
tricyclo[5.2.1.0$^{2,6}$]deca-3,8-diene,
5,6-benzobicyclo[2.2.1]hept-2-ene,
tetracyclo[6.2.1.1$^{3,6}$.0$^{2,7}$]dodec-4-ene,
9-methyltetracyclo[6.2.1.1$^{3,6}$.0$^{2,7}$]dodec-4-ene,
9-ethyltetracyclo[6.2.1.1$^{3,6}$.0$^{2,7}$]dodec-4-ene,
9-propyltetracyclo[6.2.1.1$^{3,6}$.0$^{2,7}$]dodec-4-ene,
9-butyltetracyclo[6.2.1.1$^{3,6}$.0$^{2,7}$]dodec-4-ene, and the like.

Cycloolefin Substituted with a Hydrocarbon Containing Oxygen Atom or Nitrogen Atom
5-methoxybicyclo[2.2.1]hept-2-ene,
5-ethoxybicyclo[2.2.1]hept-2-ene,
methyl bicyclo[2.2.1]hept-5-ene-2-carboxylate,
methyl 2-methylbicyclo[2.2.1]hept-5-ene-2-carboxylate,
ethyl bicyclo[2.2.1]hept-5-ene-2-carboxylate,
ethyl 2-methylbicyclo[2.2.1]hept-5-ene-2-carboxylate,
isopropyl bicyclo[2.2.1]hept-5-ene-2-carboxylate,
butyl bicyclo[2.2.1]hept-5-ene-2-carboxylate,
t-butyl bicyclo[2.2.1]hept-5-ene-2-carboxylate,
methyl tetracyclo[6.2.1.1$^{3,6}$.0$^{2,7}$]dodec-9-ene-4-carboxylate,
methyl tetracyclo[6.2.1.1$^{3,6}$.0$^{2,7}$]dodec-9-ene-4-carboxylate,
ethyl 4-methyltetracyclo[6.2.1.1$^{3,6}$.0$^{2,7}$]dodec-9-ene-4-carboxylate,
t-butyl tetracyclo[6.2.1.1$^{3,6}$.0$^{2,7}$]dodec-9-ene-4-carboxylate,
t-butyl 4-methyltetracyclo[6.2.1.1$^{3,6}$.0$^{2,7}$]dodec-9-ene-4-carboxylate,
[bicyclo[2.2.1]hept-5-e-2-yl]acetate,
[bicyclo[2.2.1]hept-5-ene-2-yl]acetate,
[bicyclo[2.2.1]hept-5-en-2-yl]propionate,
[bicyclo[2.2.1]hept-5-ene-2-yl]propionate,
bicyclo[2.2.1]hept-5-ene-2,3-dicarboxylic anhydride,
tetracyclo[6.2.1.1$^{3,6}$.0$^{2,7}$]dodec-9-ene-4,5-dicarboxylic anhydride,
bicyclo[2.2.1]hept-5-ene-N-cyclohexyl-2,3-carbonimide,
bicyclo[2.2.1]hept-5-ene-N-phenyl-2,3-carbonimide.
bicyclo[2.2.1]hept-5-ene-2-spiro-N-cyclohexylsuccinimide,
bicyclo[2.2.1]hept-5-ene-2-spiro-N-phenylsuccinimide,
5-[(3-ethyl-3-oxetanyl)methoxy]bicyclo[2.2.1]hept-2-ene,
5-[(3-ethyl-3-oxetanyl)methoxy ethyl]bicyclo[2.2.1]hept-2-ene,
5-[(3-oxetanyl)methoxy]bicyclo[2.2.1]hept-2-ene,
5-[(3-oxetanyl)methoxymethyl]bicyclo[2.2.1]hept-2-ene,
(3-ethyl-3-oxetanyl)methyl bicyclo[2.2.1]hept-5-ene-2-carboxylate, and the like.

Cycloolefin Substituted with Trialkylsilyl Group
5-trimethylsilylbicyclo[2.2.1]hept-2-ene,
5-triethylsilylbicyclo[2.2.1]hept-2-ene,
5-triisopropylsilylbicyclo[2.2.1]hept-2-ene, and the like.

Cycloolefin Substituted with Hydrolyzable Silyl Group
2-trimethoxysilylbicyclo[2.2.1]hept-5-ene,
2-triethoxysilylbicyclo[2.2.1]hept-5-ene,
2-methyldimethoxysilylbicyclo[2.2.1]hept-5-ene,
2-methyldiethoxysilylbicyclo[2.2.1]hept-5-ene,
2-methyldichlorosilylbicyclo[2.2.1]hept-5-ene,
4-trimethoxysilyltetracyclo[6.2.1.1$^{3,6}$.0$^{2,7}$]dodec-9-ene,
4-triethoxysilyltetracyclo[6.2.1.1$^{3,6}$.0$^{2,7}$]dodec-9-ene,
4-methyldimethoxysilyltetracyclo[6.2.1.1$^{3,6}$.0$^{2,7}$]dodec-9-ene,
2-[1'-methyl-2',5'-dioxa-1'-silacyclopentyl]bicyclo[2.2.1]hept-5-ene,
2-[1',3',4'-trimethyl-2',5'-dioxa-1'-silacyclopentyl]bicyclo[2.2.1]hept-5-ene,
2-[1',4',4'-trimethyl-2',6'-dioxa-1'-silacyclohexyl]bicyclo[2.2.1]hept-5-ene, and the like.

As discussed above, these compounds may be used either individually or in combination of two or more.

It is possible to control the glass transition temperature, pliability, and the like of the resulting cycloolefin addition polymer according to the object by using one or more monomers selected from the group consisting of bicyclo[2.2.1]hept-2-ene and 5-alkylbicyclo[2.2.1]hept-2-enes having an alkyl group with 1 to 12 carbon atoms (hereinafter refers to as "specific monomers (1)") among the above-described monomers. In addition, the polymerization activity can be improved by increasing the amount of the specific monomers (1) in all monomers. As a result, a deliming step or a removing step of unreacted monomers is not necessarily required. For this reason, use of the specific monomers (1) in an amount of 90 mol % or more is particularly preferable.

Furthermore, if at least one monomer selected from the group consisting of 5-butylbicyclo[2.2.1]hept-2-ene, 5-hexylbicyclo[2.2.1]hept-2-ene, 5-octylbicyclo[2.2.1]hept-2-ene, and 5-decylbicyclo[2.2.1]hept-2-ene among the specific monomers (1) is used, the resulting cycloolefin addition polymer exhibits outstanding molding processability and transparency, or can be molded by melt molding.

On the other hand, if a cycloolefin possessing a functional group selected from the group consisting of an alkoxycarbonyl group, an alkylcarbonyloxy group, an alkenylcarbonyloxy group, an acid anhydride group, an oxetanyl group, and a hydrolyzable silyl group is used, it is possible to provide the resulting cycloolefin addition copolymer with adhesiveness or to introduce a crosslinking group. However, if the proportion of the cycloolefin compounds having these functional groups is too high, polymerization activity decreases, resulting in poor productivity. Therefore, it is desirable that the amount of such monomers be not more than 10 mol %, preferably not more than 7 mol %, and still more preferably not more than 4 mol % of all monomers.

<Polymerization Catalyst>

The polymerization catalyst used in the present invention is not particularly limited inasmuch as the catalyst can copolymerize the above monomers by addition polymerization. A preferable catalyst contains a nickel compound or a palladium compound.

As specific examples of the nickel compound or palladium compound which constitutes the catalyst, carboxylic acid salts such as nickel acetate, nickel propionate, nickel 2-ethylhexanoate, nickel 3,5,5-trimethylhexanoate, nickel octanoate, nickel naphthenate, nickel neodecanoate, nickel (acetate)(hexafluoroantimonate), nickel (propionate)(hexafluoroantimonate), nickel (2-ethylhexanoate)(hexafluoroantimonate), nickel (octanoate)(hexafluoroantimonate), nickel (neodecanoate)(hexafluoroantimonate), palladium acetate, palladium chloroacetate, palladium fluoroacetate, palladium trifluoroacetate, palladium propionate, palladium 3,3,3-trifluoropropionate, palladium butyrate, palladium 3-methylbutyrate, palladium pentanoate, palladium hexanoate, palladium 2-ethylhexanoate, palladium octanoate, palladium dodecanoate, palladium naphthenate, palladium neodecanoate, palladium cyclohexanecarboxylate, palladium benzoate, palladium 2-methylbenzoate, palladium 4-methylbenzoate, and palladium naphthalenecarboxylate;

organic sulfonates having 1 to 20 carbon atoms such as nickel methanesulfonate, nickel trifluoromethanesulfonate, nickel p-toluenesulfonate, nickel benzenesulfonate, nickel dodecylbenzenesulfonate, palladium methanesulfonate, palladium trifluoromethanesulfonate, palladium p-toluenesulfonate, palladium benzenesulfonate, palladium naphthalenesulfonate, and palladium dodecylbenzenesulfonate; and beta-diketonate compounds having 5 to 15 carbon atoms such as nickel bis(acetylacetonate), nickel bis(hexafluoroacetylacetonate), palladium bis(acetylacetonate), and palladium bis(hexafluoroacetylacetonate) can be given.

As the polymerization catalyst used in the present invention, a catalyst containing a phosphine complex of divalent palladium (c) shown by the following formula (c) is preferably used.

$$Pd[P(R^1)_2(R^2)]_nX_2 \quad (c)$$

wherein $R^1$ represents a group selected from a cyclopentyl group, a cyclohexyl group, and an isopropyl group, and $R^2$ represents a hydrocarbon group having 3 to 10 carbon atoms, X is an organic anion or a beta-diketonate anion, and n is 1 or 2.

As specific examples of the phosphine complex of divalent palladium (c),
(tricyclopentylphosphine)palladium di(acetate),
[bis(tricyclopentylphosphine)]palladium di(acetate),
[dicyclopentyl(t-butyl)phosphine]palladium di(acetate),
[dicyclopentyl(cyclohexyl)phosphine]palladium di(acetate),
[dicyclopentyl(2-methylphenyl)phosphine]palladium di(acetate),
(tricyclopentylphosphine)palladium bis(trifluoroacetate),
bis(tricyclopentylphosphine)palladium bis(trifluoroacetate),
[dicyclopentyl(cyclohexyl)phosphine]palladium bis(trifluoroacetate),
(tricyclopentylphosphine)palladium di(propionate),
bis(tricyclopentylphosphine)palladium di(propionate),
(tricyclopentylphosphine)palladium bis(2-ethylhexanoate),
bis(tricyclopentylphosphine)palladium bis(2-ethylhexanoate),
(tricyclopentylphosphine)palladium bis(acetylacetonate),
bis(tricyclopentylphosphine)palladium bis(acetylacetonate),
[dicyclopentyl(cyclohexyl)phosphine]palladium bis(acetylacetonate),
(tricyclopentylphosphine)palladium bis(trifluoromethanesulfonate),
bis(tricyclopentylphosphine)palladium bis(trifluoromethanesulfonate),
(tricyclohexylphosphine)palladium di(acetate),
[bis(tricyclohexylphosphine)]palladium di(acetate),
[dicyclohexyl(t-butyl)phosphine]palladium di(acetate),
[dicyclohexyl(cyclopentyl)phosphine]palladium di(acetate),
[dicyclohexyl(2-methylphenyl)phosphine]palladium di(acetate),
(tricyclohexylphosphine)palladium bis(trifluoroacetate),
bis(tricyclohexylphosphine)palladium bis(trifluoroacetate),
[dicyclohexyl(cyclopentyl)phosphine]palladium bis(trifluoroacetate),
(tricyclohexylphosphine)palladium di(propionate),
bis(tricyclohexylphosphine)palladium di(propionate),
(tricyclohexylphosphine)palladium bis(2-ethylhexanoate),
bis(tricyclohexylphosphine)palladium bis(2-ethylhexanoate),
(tricyclohexylphosphine)palladium bis(acetylacetonate),
bis(tricyclohexylphosphine)palladium bis(acetylacetonate),
[dicyclohexyl(cyclopentyl)phosphine]palladium bis(acetylacetonate),
(tricyclohexylphosphine)palladium bis(trifluoromethanesulfonate), and
bis(tricyclohexylphosphine)palladium bis(trifluoromethanesulfonate) can be given.

As further specific examples of the nickel compound or palladium compound included in the polymerization catalyst, halides of a phosphine complex such as
bis(triphenylphosphine)nickel dichloride,
bis(triphenylphosphine)nickel dibromide,
bis(tricyclohexylphosphine)nickel dichloride,
bis(tricyclohexylphosphine)nickel dibromide,
bis(tricyclopentylphosphine)nickel dichloride,
bis(triphenylphosphine)palladium dichloride,
bis(tricyclohexylphosphine)palladium dichloride,
bis(tricyclopentylphosphine)palladium dichloride,
[1,2-bis(diphenylphosphino)ethane]nickel dichloride,
[1,2-bis(diphenylphosphino)ethane]palladium dichloride, and
[1,2-bis(diphenylphosphino)ethane]palladium methyl chloride;

a complex with a nitrile compound such as
[tetrakis(acetonitrile)palladium]tetrafluoroborate and tetrakis(benzonitrile)palladium
hexafluoroantimonate; and a complex having a sigma-bond or a pi-bond such as
[(eta3-crotyl)(1,5-cyclooctadiene)palladium]tetrakis(pentafluorophenyl)borate,
[(eta3-crotyl)(1,5-cyclooctadiene)palladium]tetrafluoroborate,
[(eta3-allyl)(tricyclohexylphosphine)palladium]trifluoroacetate,
[(eta3-allyl)(tricyclohexylphosphine)palladium]tetrakis[3,5-bis(trifluoromethyl)phenyl]borate,
(methyl)(1,5-cyclooctadiene)(tricyclohexylphosphine)palladium chloride,
[(methyl)(1,5-cyclooctadiene)(tricyclohexylphosphine)palladium]tetrakis[3,5-bis(trifluoromethyl)phenyl]borate,
[(eta3-crotyl)(1,5-cyclooctadiene)nickel]tetrakis(pentafluorophenyl)borate,
[(eta3-crotyl)(1,5-cyclooctadiene)nickel]tetrafluoroborate,
(eta6-benzene)bis(pentafluorophenyl)nickel,
(eta6-toluene)bis(pentafluorophenyl)nickel,
(eta6-benzene)bis(trichlorosilyl)nickel,
(eta6-toluene)bis(trichlorosilyl)nickel,

[6-methoxynorbornen-2-yl-5-palladium(cyclooctadiene)] hexafluorophosphate, and the like can be given.

The polymerization catalyst used in the process of the present invention is preferably a combination of the above-mentioned nickel compound or palladium compound with other catalyst components. The other catalyst components to be combined are appropriately selected according to the nickel compound or palladium compound used. The polymerization catalyst is preferably a catalyst obtained by using the following components (a), (b), and (d), or the following components (c) and (d), (a) an organic acid salt of palladium or a beta-diketonate compound of palladium, (b) a phosphine compound shown by the following formula (b), $$P(R^1)_2(R^2) \quad (b)$$

wherein $R^1$ represents a group selected from a cyclopentyl group, a cyclohexyl group, and an isopropyl group, and $R^2$ represents a hydrocarbon group having 3 to 10 carbon atoms, (c) a phosphine complex of divalent palladium shown by the following formula (c), $$Pd[P(R^1)_2(R^2)]_nX_2 \quad (c)$$

wherein $R^1$ represents a group selected from the group consisting of a cyclopentyl group, a cyclohexyl group, and an isopropyl group, and $R^2$ represents a hydrocarbon group having 3 to 10 carbon atoms, X is an organic anion or a beta-diketonate anion, and n is 1 or 2, and (d) an ionic boron compound.

As the catalyst component (a), a carboxylate of palladium, an organic sulfonate of palladium, or a beta-diketonate compound of palladium is used among the above-mentioned compounds. Of these, particularly preferable compounds are palladium acetate, palladium propionate, palladium 2-ethylhexanoate, and palladium bis(acetylacetonate), with the most preferable compound being palladium acetate.

As specific examples of the catalyst component (b), which is shown by the above formula (b), tricyclopentylphosphine, dicyclopentyl(cyclohexyl)phosphine, dicyclopentyl(3-methylcyclohexyl)phosphine, dicyclopentyl(isopropyl)phosphine, dicyclopentyl(s-butyl)phosphine, dicyclopentyl(t-butyl)phosphine, dicyclopentyl(2-methylphenyl)phosphine, tricyclohexylphosphine, dicyclohexyl(cyclopentyl)phosphine, dicyclohexyl(3-methylcyclohexyl)phosphine, dicyclohexyl(isopropyl)phosphine, dicyclohexyl(2-methylphenyl)phosphine, and triisopropylphosphine can be given. Of these catalyst components (b), tricyclopentylphosphine or tricyclohexylphosphine is preferably used.

As the catalyst component (c), among the above-mentioned compounds, a phosphine complex of divalent palladium shown by the above formula (c) is used. Particularly preferable compounds are a complex of palladium and tricyclopentylphosphine and a complex of palladium and tricyclohexylphosphine. Most preferable compounds are (tricyclopentylphosphine)palladium (acetate), (tricyclopentylphosphine)palladium bis(acetylacetonate), (tricyclohexylphosphine)palladium di(acetate), and (tricyclohexylphosphine)palladium bis(acetylacetonate). The catalyst component (c) has an advantage of exhibiting high production efficiency of active seeds and requiring almost no induction period. The phosphine complex of divalent palladium used as the catalyst component (c) can be synthesized by a general method. The synthesized product may be used after purification or isolation, or may be used without isolation.

As a method for synthesizing the catalyst component (c), a method of reacting an appropriate palladium compound and the phosphine compound of the catalyst component (b) at 0 to 70° C. in an aromatic hydrocarbon solvent or a halogenated hydrocarbon solvent, for example, can be given.

As the catalyst component (d), which is an ionic boron compound, a compound formed from a cation and a boron-containing anion can be used. As a preferable ionic boron compound (d), compounds shown by the following formula (d) can be given.

$$[R^3]^+[M(R^4)_4]^- \quad (d)$$

wherein $R^3$ represents an organic cation having 4 to 25 carbon atoms selected from the group consisting of carbenium cation, phosphonium cation, ammonium cation, and anilinium cation, M represents a boron atom or an aluminum atom, and $R^4$ represents a phenyl group substituted with a fluorine atom or a fluororoalkyl group.

As specific examples of the ionic boron compound (d), triphenylcarbeniumtetrakis(pentaluorophenyl)borate, tri(p-tolyl)carbeniumtetrakis(pentafluorophenyl)borate, triphenylcarbeniumtetrakis[3,5-bis(trifluoromethyl)phenyl]borate,
tri(p-tolyl)carbeniumtetrakis[3,5-bis(trifluoromethyl)phenyl]borate,
triphenylcarbeniumtetrakis(2,4,6-trifluorophenyl)borate,
triphenylphosphoniumtetrakis(pentafluorophenyl)borate,
diphenylphosphoniumtetrakis(pentafluorophenyl)borate,
tributylammoniumtetrakis(pentafluorophenyl)borate,
N,N-dimethylanliniumtetrakis(pentafluorophenyl)borate,
N,N-diethylaniliniumtetrakis(pentafluorophenyl)borate, and the like can be given.

Of these compounds, ionic boron compounds in which the cation is the carbenium cation and the anion is tetrakis(pentafluorophenyl)borate or tetrakis(perfluoroalkylphenyl)borate anion are preferable, and triphenylcarbeniumtetrakis (pentafluorophenyl)borate and triphenylcarbeniumtetrakis [3,5-bis(trifluoromethyl)phenyl]borate are most preferable.

The organic acid salt of palladium or the beta-diketonate compound of palladium of the catalyst component (a) or the phosphine complex of divalent palladium of the catalyst component (c) is used in an amount, as palladium atoms, of 0.0005 to 0.02 mmol, preferably 0.001 to 0.01 mmol, and more preferably 0.01 to 0.005 mmol, per one mol of monomers. Since a high conversion rate can be achieved by using only such a small amount of catalyst component (a) or (c) in the addition polymerization, the process of the present invention is highly economical and productive. In addition, since the metal component which remains in the addition polymer can be reduced, it is possible to produce molded articles with little tincture and excellent transparency. In some cases, the deliming step may be omitted. The amount of the phosphine compound contained in the catalyst component (b) is normally from 0.1 to 5 mol, preferably from 0.5 to 2 mol, per one mol of palladium atom contained in the catalyst component (a) for high polymerization activity.

The amount of the ionic boron compound in the catalyst component (d) is normally from 0.5 to 10 mol, preferably from 0.7 to 5.0 mol, and more preferably from 1.0 to 2.0 mol, per one mol of palladium atom contained in the catalyst component (c).

There are no specific limitations to the method of preparation and method of use such as the order of addition of the catalyst components (a) to (d). They may be added either simultaneously or sequentially to the polymerization system.

<Molecular Weight Controlling Agent>

In the process for preparing a cycloolefin addition polymer according to the present invention, the addition polymerization of a cycloolefin compound is preferably carried out in the presence of a molecular weight controlling agent in order to control the molecular weight of the addition polymer obtained according to the application. As examples of the molecular weight controlling agent, a 1-alkene compound or a substituted 1-alkene compound such as ethylene, propylene, 1-butene, 1-hexene, 1-octene, trimethyl vinyl silane, and trimethoxy vinyl silane; monocyclic monoolefin compounds such as cyclopentene; and aromatic vinyl compounds such as styrene and alpha-methylstyrene can be given. Among these molecular weight controlling agents, a 1-alkene compound is preferable, with ethylene being particularly desirable. The amount of the molecular weight controlling agent varies according to the target molecular weight of the cycloolefin addition copolymer, the catalyst used, polymerization temperature, and the like. A preferable amount is 0.001 to 0.5 mol per one mol of the monomers used. The above-mentioned molecular weight controlling agents may be used either individually or in combination of two or more.

<Polymerization Method>

A general polymerization process of manufacturing cycloolefin addition polymers produces a large amount of low molecular weight components, which occasionally resulted in poor mechanical strength and heat resistant. It was discovered that the production of low molecular weight components is caused by the difference in reactivity of the cycloolefin compound and reactivity of the molecular weight controlling agent. That is, since the molecular weight controlling agent has a reactivity extremely slower than the reactivity of the monomers, a large amount of the molecular weight controlling agent remains unreacted in the system in the later stage of the polymerization. This results in production of low molecular weight components, particularly when a high conversion rate is pursued. As a means for inhibiting such a phenomenon, a method of terminating the polymerization reaction at a low conversion rate can be given. However, this is not desirable from the viewpoint of economy and productivity.

According to the process of the present invention, production of low molecular weight components can be inhibited even if a high conversion rate is pursued by providing a step of initiating the polymerization reaction using the monomers in an amount of not more than 80 wt % of the total monomers and a step of supplying the remaining monomers to the reaction system during the polymerization reaction. That is, while the ratio of the molecular weight controlling agent to the monomers remarkably changes as the reaction proceeds in a general method, that change in the ratio of the molecular weight controlling agent to the monomers can be controlled by additionally supplying the monomers to the reaction system. The amount of the monomers used in the step of initiating the polymerization reaction is preferably 20 to 80 wt %, more preferably 30 to 75 wt %, and still more preferably 30 to 70 wt % of the total monomers. These ranges include all specific values and subranges therebetween, such as 25, 35, 40, 45, 50, 55, 60 and 65% by weight. If more than 80 wt %, a sufficient effect of inhibiting the production of low molecular weight components while achieving a high conversion rate may not be obtained. The remaining cycloolefin compounds may be added at one time, but are preferably added in two or more stages or added continuously to the reaction system in order to produce a homogeneous polymer by inhibiting fluctuation of the monomer concentration in the reaction system. Of course, the amount of monomer composition used at the initiation of polymerization and the amount added thereafter must total 100% by weight. In addition, the remaining monomers are preferably added to the reaction system after the conversion rate to the total amount of the monomers reaches 20%.

In the process of the present invention, when the monomers contain two or more different cycloolefin compounds, it is desirable that the entire quantity of the monomer components which is used in an amount of 20 wt % or more be divided and added in parts in the step of initiating the polymerization reaction and in the step of supplying the remaining portion during the polymerization reaction. However, when a certain cycloolefin compound is used in an amount of 20 wt % or less of the total amount of the monomers, such a small amount of cycloolefin compound need not necessarily be added in parts in the two steps, since the effect on the molecular weight distribution and heat generation will be comparatively small but, preferably the entire quantity of monomer components which is used in an amount of 10 wt % or more, more preferably the entire quantity of the monomer components which is used in an amount of 5 wt % or more can be divided and added in parts in the step of initiating the polymerization reaction and in the step of supplying the remaining portion during the polymerization reaction. JP-A-2005-48060 describes a method of introducing only a specific monomer in parts in the two steps. The effect of JP-A-2005-48060 is, however, no more than the reduction of component distribution of cycloolefin addition polymers, and the disclosed method does not provide the same effect as that obtained in the process of the present invention. The ratio to be added in parts in the two steps and the number of times of addition during the reaction need not be the same for cycloolefin compounds making up the entire quantity of monomer components, but may be appropriately determined according to the application, the polymerization reaction ratio, and the like. Thus, in one embodiment of the present invention, the monomer composition comprises at least two different monomers, where at least one monomer comprises at least 20 wt % of the monomer composition, and where a portion of said at least one monomer is used in the initiation of the polymerization and the remaining portion is added during the polymerization. In another embodiment, the monomer composition comprises at least two different monomers, where at least one monomer comprises at least 10 wt % of the monomer composition, and where a portion of said at least one monomer is used in the initiation of the polymerization and the remaining portion is added during the polymerization. In another embodiment, the monomer composition comprises at least two different monomers, where at least one monomer comprises at least 5 wt % of the monomer composition, and where a portion of said at least one monomer is used in the initiation of the polymerization and the remaining portion is added during the polymerization. Preferably, at lease two different monomers each comprising at least 5, 10 or 20 wt % of the monomer composition are used in the initiation of the polymerization and the remaining portion is added during the polymerization. More preferably, each monomer comprising at least 5, 10 or 20 wt % of the monomer composition is used in the initiation of the polymerization and the remaining portion is added during the polymerization. In another embodiment, the monomer composition comprises at least two different monomers, where at least one monomer comprises less than 20 wt % of the monomer composition, and where the total amount of said monomer is either used in the initiation of the polymerization or added during the polymerization. In another embodiment, the monomer composition comprises at least two different monomers, where at least one monomer comprises at most 5 wt % of the monomer composition, and where the total amount of said monomer is either used in the initiation of the polymerization or added during the polymerization.

In addition, a controlled molecular weight, narrow molecular weight distribution, and a high polymerization conversion rate can be attained in the process of the present invention by a continuous polymerization method, in which the monomers, catalysts, solvents, and other required raw materials are continuously introduced to a reactor, while continuously removing the reaction product. When the polymerization reaction is carried out by a continuous polymerization method, the reactor may be a vessel reactor or a pipe reactor. Although two or more reactors may be used by connecting them, it is preferable to use a vessel reactor as a first reactor, in order to stably control the composition in the system at the early stage of the reaction and the temperature in the reactor. Since it is difficult to achieve a high conversion rate by using a single vessel reactor, it is desirable to connect a pipe reactor or a batch reactor after the first vessel reactor. If only the vessel reactor is used, it is desirable to connect two or more, preferably three or more, vessel reactors. There are no specific limitations to the method of introducing the raw materials. The method of adding the raw materials may be appropriately determined according to the shape of the reactor used, the reactivity ratio of each monomer component, and the like. A more homogeneous polymer can be obtained by connecting two or more reactors and introducing at least some of the monomers to at least one reactor after the first reactor.

Since the process of the present invention can more effectively control the fluctuation of the monomer concentration, adverse effects such as deactivation of the catalyst due to heat generation at an early stage of the polymerization, molecular weight changes beyond the allowable range, and the like can be prevented. In addition, the load on the cooling system can be reduced.

The polymerization reaction is carried out under an atmosphere of nitrogen or argon, but may be carried out also in air. The reaction is carried out at 0 to 150° C., preferably at 10 to 100° C., and more preferably at 20 to 80° C. Since the molecular weight and other properties vary according to the reaction temperature, the temperature should be set in a range as narrow as possible. In particular, the reaction temperature change during the stage of conversion rate of 0 to 90% should be 20° C. or less, and preferably 15° C. or less. There are no specific limitations to the solvent used. Alicyclic hydrocarbon solvents, such as cyclohexane, cyclopentane, and methylcyclopentane, aliphatic hydrocarbon solvents such as hexane, heptane, and octane, aromatic hydrocarbon solvents such as toluene, benzene, xylene, ethylbenzen, and mesitylene, and halogenated hydrocarbon solvents such as dichloromethane, 1,2-dichloroethylene, 1,1-dichloroethylene, tetrachloroethylene, chlorobenzene, and dichlorobenzene can be used either individually or in combination of two or more. Of these solvents, alicyclic hydrocarbon solvents and aromatic hydrocarbons solvents are preferable. The solvent is used normally in an amount of 0 to 2,000 parts by weight per 100 parts by weight of the monomers.

The process for manufacturing a cycloolefin addition polymer according to the present invention can produce a polymer with high homogeneity at a high conversion rate. In the case of the addition polymerization in which the above-mentioned palladium catalyst containing the catalyst components (a), (b), and (d), or the palladium catalyst containing the catalyst components (c) and (d) is used, excellent catalytic activity can be attained, which enables attainment of a high conversion rate by using a small amount of the catalyst. Since the process of the present invention can attain a conversion rate preferably of 96% or more, and more preferably 99% or more, steps of removing unreacted monomers or residual metal components are not always required. When optionally removing residual metal components, general methods, for example, extraction of the polymerization reaction solution using an aqueous solution of lactic acid, glycolic acid, oxycarboxylic acid such as oxypropionic acid and oxybutyric acid, triethanolamine, dialkylethanolamine, or ethylenediaminetetraacetate, a methanol solution, or an ethanol solution; adsorption using diatomaceous earth, silica, alumina, activated carbon, celite, or the like; and filtration using a filter can be used. Alternatively, the polymerization reaction solution may be coagulated using an alcohol such as methanol, ethanol, and propanol, or a ketone such as acetone and methyl ethyl ketone. The content of metal components included in the cycloolefin addition copolymer can be reduced to 10 ppm or less, and preferably to 5 ppm or less, as a metal element.

The cycloolefin addition polymer can be obtained by further subjecting the polymerization reaction solution to a solvent-removing step. There are no particular limitations to the solvent-removing method. For example, a method of heating and condensing the solution under reduced pressure, a method of introducing steam, and a method of drying and palletizing using an extruder can be used. It is also possible to prepare a film by casting the polymerization reaction solution as is.

<Properties of Addition Polymer>

The polystyrene-reduced number average number average molecular weight (Mn) of the cycloolefin addition polymer of the present invention, measured by gel permeation chromatography (GPC) is 20,000 to 200,000, preferably 30,000 to 100,000, and more preferably 30,000 to 50,000. If the number average molecular weight is less than 20,000, the molded articles may become brittle due to decreased mechanical strength. If the number average molecular weight is more than 200,000, the polymer has so high a melting viscosity that it may be difficult to mold a product with ease, or flatness of the resulting molded product may be impaired.

The molecular weight of the cycloolefin addition copolymer can be adjusted by polymerizing monomers in the presence of a suitable molecular weight controlling agent. Although the molecular weight distribution of the cycloolefin polymer obtained by the process of the present invention significantly varies according to the catalyst, monomers, the target molecular weight, and the like, the value indicated by Mw/Mn is preferably 4.3 or less, more preferably 4.0 or less, and most preferably 3.5 or less. Mw represents the weight-average molecular weight of the cycloolefin addition polymer.

The cycloolefin addition polymer obtained by the process of the present invention excels in transparency and has a luminous transmission measured using a film with a thickness of 100 micrometers of normally 85% or more, and preferably 88% or more, and a haze value normally of 2.0% or less, and preferably 1.0% or less.

<Additives>

Various additives may optionally be added to the cycloolefin addition polymer obtained by the process of the present invention. For example, in order to improve oxidation stability and to prevent coloring and degradation, an antioxidant selected from the group consisting of a phenolic antioxidant, a lactone antioxidant, a phosphorus-containing antioxidant, and a sulfur-containing antioxidant may be added in an amount of 0.001 to 5 parts by weight per 100 parts by weight of the addition polymer. Specific examples of the antioxidant include:

1) phenolic antioxidants or hydroquinone antioxidants such as 2,6-di-t-butyl-4-methylphenol, 4,4'-thiobis-(6-t-butyl-3-methylphenol), 1,1'-bis(4-hydroxyphenyl)cyclohexane, 2,2'-methylenebis(4-ethyl-6-t-butylphenol), tetrakis[methylene-3-(3,5-di-t-butyl-4-hydroxyphenyl)propionate]methane, 3-(3,5-di-t-butyl-4-hydroxyphenyl)propionic acid stearate, 2,5-di-t-butylhydroquinone, and pentaerythrityl-tetrakis[3-(3,5-di-t-butyl-4-hydroxyphenyl)]propionate, 2) phosphorus-containing secondary antioxidants such as bis(2,6-di-t-butyl-4-methylphenyl)pentaerythritol diphosphite, tris(2,4-di-t-butylphenyl)phosphite, tetrakis(2,4-di-t-butyl-5-methylphenyl)-4,4'-biphenylenediphosphonite, 3,5-di-t-butyl-4-hydroxybenzylphosphonate-diethyl ester, bis(2,4-di-t-butylphenyl)pentaerythritol diphosphite, tris(4-methoxy-3,5-diphenyl)phosphite, and tris(nonylphenyl)phosphite, and 3) sulfur-containing secondary antioxidants such as dilauryl-3,3'-thiodipropionate and 2-mercaptobenzimidazole.

A flame retardant may also be added to the cycloolefin addition polymer obtained by the process of the present invention. A common flame retardant, such as a halogen-containing flame retardant, an antimony-containing flame retardant, a phosphate-based flame retardant, and a metal hydroxide can be used. Of these, a phosphate-based flame retardant which can exhibit an adequate effect by the addition of a small amount, with minimal deterioration of water absorptivity, low dielectric constant, and transparency, is preferable. Condensed phosphate-based flame retardants such as
1,3-bis(phenylphosphoryl)benzene,
1,3-bis(diphenylphosphoryl)benzene,
1,3-bis[di(alkylphenyl)phosphoryl]benzene,
1,3-bis[(di(2',6'-dimethylphenyl)phosphoryl]benzene,
1,3-bis[(di(2',6'-diethylphenyl)phosphoryl]benzene,
1,3-bis[(di(2',6'-diisopropylphenyl)phosphoryl]benzene,
1,3-bis[(di(2',6'-dibutylphenyl)phosphoryl]benzene,
1,3-bis[(di(2'-t-butylphenyl)phosphoryl]benzene,
1,3-bis[(di(2'-isopropylphenyl)phosphoryl]benzene,
1,3-bis[(di(2'-methylphenyl)phosphoryl]benzene,
1,4-bis(diphenylphosphoryl)benzene,
1,4-bis[(di(2',6'-dimethylphenyl)phosphoryl]benzene,
1,4-bis[(di(2',6'-diethylphenyl)phosphoryl]benzene,
1,4-bis[(di(2',6'-diisopropylphenyl)phosphoryl]benzene,
1,4-bis[(di(2'-t-butylphenyl)phosphoryl]benzene,
1,4-bis[(di(2-isopropylphenyl)phosphoryl]benzene,
1,4-bis[(di(2'-methylphenyl)phosphoryl]benzene, and
4,4'-bis[(di(2',6'-dimethylphenyl)phosphorylphenyl]dimethylmethane are more preferable.

The amount incorporated is determined according to selection of the flame retardant and the degree of required flame retardancy in a range preferably from 0.5 to 40 parts by weight, more preferably from 2 to 30 parts by weight, and most preferably from 4 to 20 parts by weight, per 100 parts by weight of the cycloolefin copolymer. If the amount is less than 0.5 parts by weight, the effect is insufficient. If more than 40 parts by weight, problems such as a decrease of transparency, deterioration of electrical properties such as the dielectric constant, an increase in water absorption, and deterioration of heat resistance may occur.

As required, various other additives such as a lubricant, a UV absorber, a leveling agent, and a dye may further be added to the cycloolefin addition polymer obtained by the process of the present invention.

<Molded Article>

A cycloolefin addition polymer obtained by the process of the present invention can be molded by injection molding, extrusion molding, compression molding, and the like. It is also possible to mold the polymer into a form such as a film or a sheet by casting the polymer in a suitable solvent.

As required, a conductive film such as an ITO film, a polythiophene film, and a polyaniline film; a barrier such as a silicon dioxide film, a silicon nitride film, and an aluminum oxide film; other general hard-coat layers, an antireflection layer, a damp-proof layer, an infrared filter layer, an ultraviolet-radiation filter layer, an agglutinant layer, and the like, can be formed on the molded articles made from the cycloolefin addition polymer of the present invention. As the method for forming such a film, a method of coating, a method of adhering, a vacuum-deposition method, a sputtering method, an ion plating method, and the like can be given.

<Application>

The cycloolefin addition polymer obtained by the process of the present invention has outstanding transparency and heat resistance, low water absorptivity, and a low dielectric constant, and can be suitably used for various optical materials, electrical and electronic parts, medical application substrates, and the like.

As the optical parts, the cycloolefin addition polymer of the present invention can be used in a liquid crystal display element, an organic EL device, a plasma display and electronic paper, a color filter substrate for display, a nano-imprint substrate, an optical waveguide, a transparent electric conduction film and a transparent electric conduction membrane having an ITO or a conductive resin layer laminated thereon, a touch panel, a lightguide plate, a protection film, a polarization film, a protective film for a polarizing plate, a phase difference film, a near-infrared cut film, an optical diffusion film, an antireflective film, a high reflective film, a half-penetration half reflective film, an ND filter, a dichroic filter, an electromagnetic wave shield film, a beam splitter, a filter for optical communication, a Fresnel lens, a camera lens, a pick-up lens, a F-theta lens, a prism, and an optical record substrate such as MD, CD, and DVD. As a medical application substrate, the cycloolefin addition polymer can be used as a package material for medical supplies, a sterile container, a syringe, a pipe, an inner tube, an ampoule, and the like. As the electronic and an electrical parts, the polymer can be used as a material for a container, a tray, a carrier tape, a separation film, an insulated film, a print circuit board, and the like.

EXAMPLES

The present invention is described below in more detail by way of examples. However, the present invention is not limited to the following examples. Various properties such as a molecular weight and glass transition temperature of the cycloolefin addition polymer, transparency of the film, and strength were determined according to the following methods.

(1) Molecular Weight

The molecular weight was measured using a Waters 150C model gel permeation chromatography (GPC) apparatus equipped with an H type column manufactured by Tosoh Corporation at a temperature of 120° C. using o-dichlorobenzene as a solvent. The molecular weight obtained was a standard polystyrene-reduced value.

(2) Copolymer Composition

A supernatant liquid obtained by aggregating the polymer by adding an excess amount of isopropanol to a sample of the polymerization reaction solution was analyzed by gas chromatography ("GC-14B" manufactured by Shimadzu Corp.) equipped with a capillary column (film thickness: 1 micrometer, inner diameter: 0.25 mm, length: 60 m) to quantitatively measure the amount of remaining monomers and calculate the composition.

(3) Total Light Transmittance and Haze The total light transmittance and the haze value of a film with a thickness of 100 micrometers were measured according respectively to ASTM-D 1003 and JIS K7105 using "Haze-Gard plus" (a product manufactured by BYK-Gardner).

(4) Tensile Breaking Strength and Tensile Breaking Elongation

The tensile breaking strength and tensile breaking elongation were measured according to JIS K7113 at a drawing rate of 3 mm/min.

Example 1

A 20 l stainless steel autoclave equipped with a jacket, of which the internal atmosphere was sufficiently replaced with nitrogen, was charged with 8.9 kg of toluene, 875 g (9.30 mol) of bicyclo[2.2.1]hept-2-ene and 1.07 kg (7.13 mol) of 5-butylbicyclo[2.2.1]hept-2-ene, dissolved in toluene. The pressure of nitrogen was increased to 0.05 MPa. Ethylene was introduced to make the partial pressure 0.0065 MPa while stirring, and the mixture was heated to 50° C.

0.05 mmol of (tricyclopentylphosphine)palladium di(acetate) and 0.05 mmol of triphenylcarbeniumtetrakis(pentafluorophenyl)borate were respectively dissolved in toluene, and the solutions were added to the mixture to initiate polymerization. After confirming an increase in the internal temperature, cold water was circulated to control the temperature at 50±5° C. The conversion rate was determined by collecting samples from time to time. Additional monomers were supplied at conversion rates shown in Table 1. As a result of continuing the reaction for six hours in total, a solution of a Copolymer A was obtained at a conversion rate of 99.8%. Mn of the Copolymer A was 70,000 and Mw was 213,000.

Toluene was added to adjust the solid content to 22%, followed by the addition of pentaerythrityltetrakis[3-(3,5-di-t-butyl-4-hydroxyphenyl)propionate] and tris(2,4-di-t-butylphenyl)phosphate, each in an amount of 0.3 parts by weight per 100 parts by weight of the solid components. The resulting solution was cast onto a PET film and dried at 180° C. for 90 minutes in an nitrogen atmosphere to obtain a Film A with a thickness of 100 micrometers. The evaluation results of the Film A are shown in Table 1.

TABLE 1

| Monomer addition | Conversion rate | Bicyclo[2.2.1]hept-2-ene | 5-Butylbicyclo[2.2.1]hept-2-ene |
|---|---|---|---|
| 0 | Start | 875 g (9.30 mol) | 1070 g (7.13 mol) |
| 1 | 44% | 290 g (3.10 mol) | 357 g (2.38 mol) |
| 2 | 67% | 219 g (2.33 mol) | — |
| 3 | 92% | 73 g (0.78 mol) | — |
| | Total | 1457 g (15.5 mol) | 1427 g (9.51 mol) |

Comparative Example 1

A 20 l stainless steel autoclave equipped with a jacket, of which the internal atmosphere was sufficiently replaced with nitrogen, was charged with 8.9 kg of toluene, 1.46 kg (15.5 mol) of bicyclo[2.2.1]hept-2-ene and 1.43 kg (9.50 mol) of 5-butylbicyclo[2.2.1]hept-2-ene, dissolved in toluene. The pressure of nitrogen was increased to 0.05 MPa. Ethylene was introduced to make the partial pressure 0.0090 MPa while stirring, and the mixture was heated to 50° C.

0.05 mmol of (tricyclopentylphosphine)palladium di(acetate) and 0.05 mmol of triphenylcarbeniumtetrakis(pentafluorophenyl)borate were respectively dissolved in toluene, and the solutions were added to the mixture to initiate polymerization. After confirming an increase in the internal temperature, cold water was circulated. The maximum temperature was 63° C. and the temperature was decreased to 50° C. at 60 minutes after initiation. The polymerization was continued for six hours without adding monomers to confirm that the conversion rate was 98% and all remaining monomer was 5-butylbicyclo[2.2.1]hept-2-ene. As a result of a continued reaction for a further two hours, a solution of a cloudy Copolymer B was obtained at a conversion rate of 99.5%. Mn of the Copolymer B was 49,000 and Mw was 220,000. As shown in Table 2, a decrease of average molecular weights with the progress of the polymerization resulted in broadened molecular weight distributions, clearly indicating production of low molecular weight components in the later stage of polymerization.

A Film B with a thickness of 100 micrometers was obtained in the same manner as in Example 1. The evaluation results of the Film B are shown in Table 6.

TABLE 2

| Conversion rate | Mw | Mn | Mw/Mn |
|---|---|---|---|
| 40% | 321,000 | 157,000 | 2.0 |
| 71% | 272,00 | 115,000 | 2.4 |
| 90% | 225,000 | 70,000 | 3.2 |
| 99.5% | 220,000 | 49,000 | 4.5 |

Comparative Example 2

A 20 l stainless steel autoclave equipped with a jacket, of which the internal atmosphere was sufficiently replaced with nitrogen, was charged with 8.9 kg of toluene, 1.22 kg (13.0 mol) of bicyclo[2.2.1]hept-2-ene and 1.43 kg (9.50 mol) of 5-butylbicyclo[2.2.1]hept-2-ene, dissolved in toluene. The pressure of nitrogen was increased to 0.05 MPa. Ethylene was introduced to make the partial pressure 0.0085 MPa while stirring, and the mixture was heated to 50° C.

0.05 mmol of (tricyclopentylphosphine)palladium di(acetate) and 0.05 mmol of triphenylcarbeniumtetrakis(pentafluorophenyl)borate were respectively dissolved in toluene, and the solutions were added to the mixture to initiate polymerization. After confirming an increase in the internal temperature, cold water was circulated. The maximum temperature was 59° C. and the temperature was decreased to 50° C. at 45 minutes after initiation. The conversion rate for each addition of monomers and the amount of monomers added are shown in Table 3. As a result of continuing the reaction for six hours in total, a solution of a Copolymer C was obtained at a conversion rate of 99.8%. Mn of the Copolymer C was 59,000 and Mw was 221,000.

A Film C with a thickness of 100 micrometers was obtained in the same manner as in Example 1. As can be seen from the evaluation results shown in Table 6, the film has poor strength when the proportion of monomers supplied during the reaction is small.

TABLE 3

| Monomer addition | Conversion rate | Bicyclo[2.2.1]hept-2-ene | 5-Butylbicyclo[2.2.1]hept-2-ene |
|---|---|---|---|
| 0 | Start | 1220 g (13.0 mol) | 1430 g (9.50 mol) |
| 1 | 71% | 118 g (1.25 mol) | — |
| 2 | 93% | 118 g (1.25 mol) | — |
| Total | | 1456 g (15.5 mol) | 1427 g (9.50 mol) |

Example 2

A 20 l stainless steel autoclave equipped with a jacket, of which the internal atmosphere was sufficiently replaced with nitrogen, was charged with 8.7 kg of toluene, 902 g (9.59 mol) of bicyclo[2.2.1]hept-2-ene and 600 g (3.99 mol) of 5-butylbicyclo[2.2.1]hept-2-ene, dissolved in toluene. The pressure of nitrogen was increased to 0.05 MPa. Ethylene was introduced to make the partial pressure 0.0085 MPa while stirring, and the mixture was heated to 50° C. 0.053 mmol of (tricyclopentylphosphine)palladium di(acetate) and 0.053 mmol of triphenylcarbeniumtetrakis(pentafluorophenyl)borate were respectively dissolved in toluene, and the solutions were added to the mixture to initiate polymerization. After confirming an increase in the internal temperature, cold water was circulated to control the temperature at 50±5° C. The conversion rate was determined by collecting samples from time to time. Additional monomers were supplied at conversion rates shown in Table 4. As a result of continuing the reaction for six hours in total, a solution of a Copolymer D was obtained at a conversion rate of 99.9%. Mn of the Copolymer D was 66,000 and Mw was 208,000.

Toluene was added to adjust the solid content to 19%, followed by the addition of pentaerythrityltetrakis[3-(3,5-di-t-butyl-4-hydroxyphenyl)propionate] and tris(2,4-di-t-butylphenyl)phosphate, each in an amount of 0.3 parts by weight per 100 parts by weight of the solid components. The resulting solution was cast onto a PET film and dried at 200° C. for 90 minutes in an nitrogen atmosphere to obtain a Film D with a thickness of 100 micrometers. The evaluation results of the Film D are shown in Table 6.

TABLE 4

| Monomer addition | Conversion rate | Bicyclo[2.2.1]hept-2-ene | 5-Butylbicyclo[2.2.1]hept-2-ene |
|---|---|---|---|
| 0 | Start | 903 g (9.59 mol) | 600 g (3.99 mol) |
| 1 | 42% | 601 g (6.39 mol) | 400 g (2.66 mol) |
| 2 | 80% | 282 g (3.00 mol) | — |
| 3 | 96% | 94 g (1.00 mol) | — |
| Total | | 1879 g (19.9 mol) | 1000 g (6.65 mol) |

Comparative Example 3

A 20 l stainless steel autoclave equipped with a jacket, of which the internal atmosphere was sufficiently replaced with nitrogen, was charged with 8.9 kg of toluene, 1.88 kg (20.0 mol) of bicyclo[2.2.1]hept-2-ene and 1.00 kg (6.65 mol) of 5-butylbicyclo[2.2.1]hept-2-ene, dissolved in toluene. The pressure of nitrogen was increased to 0.05 MPa. Ethylene was introduced to make the partial pressure 0.0110 MPa while stirring, and the mixture was heated to 50° C.

0.053 mmol of (tricyclopentylphosphine)palladium di(acetate) and 0.053 mmol of triphenylcarbeniumtetrakis(pentafluorophenyl)borate were respectively dissolved in toluene, and the solutions were added to the mixture to initiate polymerization. After confirming an increase in the internal temperature, cold water was circulated. The maximum temperature was 65° C. and the temperature was decreased to 50° C. at 70 minutes after initiation. The polymerization was continued for six hours without adding monomers to obtain a solution of a Copolymer E at a conversion rate of 99.6%. Mn of the Copolymer E was 44,000 and Mw was 205,000.

A Film E with a thickness of 100 micrometers was obtained in the same manner as in Example 1. The evaluation results of the Film E are shown in Table 6.

Example 3

A 20 l stainless steel autoclave equipped with a jacket, of which the internal atmosphere was sufficiently replaced with nitrogen, was charged with 8.7 kg of toluene and 915 g (9.72 mol) of bicyclo[2.2.1]hept-2-ene, 527 g (3.51 mol) of 5-butylbicyclo[2.2.1]hept-2-ene, and 83.3 g (0.39 mol) of 2-trimethoxysilylbicyclo[2.2.1]hept-5-ene dissolved in toluene. The pressure of nitrogen was increased to 0.05 MPa. Ethylene was introduced to make the partial pressure 0.0085 MPa while stirring, and the mixture was heated to 50° C. 0.054 mmol of (tricyclopentylphosphine)palladium di(acetate) and 0.054 mmol of triphenylcarbeniumtetrakis(pentafluorophenyl)borate were respectively dissolved in toluene, and the solutions were added to the mixture to initiate polymerization. After confirming an increase in the internal temperature, cold water was circulated to control the temperature at 50±5° C., and additional monomers were added at conversion rates shown in Table 5. As a result of continuing the reaction for six hours in total, a solution of a Copolymer F was obtained at a conversion rate of 99.9%. Mn of the Copolymer F was 66,000 and Mw was 212,000.

Toluene was added to adjust the solid content to 19%, followed by the addition of pentaerythrityltetrakis[3-(3,5-di-t-butyl-4-hydroxyphenyl)propionate] and tris(2,4-di-t-butylphenyl)phosphate, each in an amount of 0.3 parts by weight per 100 parts by weight of the solid components. The resulting solution was cast onto a PET film and dried at 200° C. for 90 minutes in the presence of steam to obtain a Film F with a thickness of 100 micrometers. The evaluation results of the Film F are shown in Table 6.

TABLE 5

| Monomer addition | Conversion rate | Bicyclo[2.2.1]hept-2-ene | 5-Butylbicyclo[2.2.1]hept-2-ene | 2-Trimethoxysilylbicyclo[2.2.1]hept-5-ene |
|---|---|---|---|---|
| 0 | Start | 915 g (9.72 mol) | 527 g (3.51 mol) | 83.3 g (0.39 mol) |
| 1 | 42% | 610 g (6.48 mol) | 365 g (2.43 mol) | 55.5 g (0.26 mol) |
| 2 | 76% | 286 g (3.04 mol) | — | 26.0 g (0.12 mol) |
| 3 | 97% | 95.3 g (1.01 mol) | — | 8.7 g (0.04 mol) |
| Total | | 1906 g (20.2 mol) | 892 g (5.94 mol) | 173.5 g (0.81 mol) |

Example 4

Two 20 l vessel-type reactors made of stainless steel, each equipped with a stirring blade and a jacket, were connected in series. The first reactor was continuously charged with a toluene solution of bicyclo[2.2.1]hept-2-ene (75 wt %) at a rate of 0.81 l/hr, 5-butylbicyclo[2.2.1]hept-2-ene at a rate of 0.47 l/hr, toluene at a rate of 3.47 l/hr, ethylene at a rate of 0.90 Nl/hr, a toluene solution of (tricyclopentylphosphine) palladium di(acetate) (0.001 mol/l) at a rate of 18 ml/hr, and a toluene solution of triphenylcarbeniumtetrakis(pentafluorophenyl)borate (0.001 mol/l) at a rate of 18 ml/hr. The second reactor was charged with a toluene solution of bicyclo [2.2.1]hept-2-ene (75 wt %) at a rate of 0.10 l/hr. The copolymerization reaction was carried out while maintaining the internal pressure of the two vessel reactors at 50° C. After the reaction was sufficiently stabilized, a portion of the polymer solution (conversion rate: 97-98%) which was continuously discharged from the second reactor was sampled in a glass flask, allowed to stand still at 50° C. for two hours to obtain a solution of a Copolymer G at a conversion rate of 99.8%. Mn of the Copolymer G was 80,000 and Mw was 202,000.

A Film G with a thickness of 100 micrometers was obtained in the same manner as in Example 1. The evaluation results of the Film G are shown in the Table 6.

TABLE 6

| | Monomer | | | Tensile | Total light | |
| | Start (weight %) | Addition (weight %) | Mw/Mn | strength/elongation (MPa/%) | transmittance (%) | Haze (%) |
|---|---|---|---|---|---|---|
| Example 1 | 67 | 33 | 3.0 | 61/8.4 | 92 | 0.4 |
| Comparative Example 1 | 100 | 0 | 4.5 | 50/7.0 | 88 | 1.2 |
| Comparative Example 2 | 92 | 8 | 4.1 | 52/7.3 | 92 | 0.4 |
| Example 2 | 52 | 48 | 3.2 | 67/8.9 | 92 | 0.5 |
| Comparative Example 2 | 100 | 0 | 4.8 | 57/6.2 | 87 | 1.6 |
| Example 3 | 51 | 49 | 3.1 | 72/8.9 | 92 | 0.5 |
| Example 4 | — | — | 2.5 | 73/9.4 | 92 | 0.4 |

The concentration of monomer dissolved in toluene, with the exception of Example 4, was about 75 wt %. The concentration of (tricyclopentylphosphine)palladium di(acetate) dissolved in toluene was about 0.005 mol/L. The concentration of triphenylcarbeniumtetrakis(pentafluorophenyl)borate dissolved in toluene is about 0.002 mol/L.

According to the process of the present invention, a cycloolefin addition polymer suitable for use for various optical materials, electrical and electronic parts, medical application substrates, and the like can be manufactured.

As the optical parts, the cycloolefin addition polymer can be used as a liquid crystal display element, an organic EL device, a plasma display and electronic paper, a color filter substrate for display, a nano-imprint substrate, a transparent electric conduction film and a transparent electric conduction membrane having an ITO or a conductive resin layer laminated thereon, a touch panel, a lightguide plate, a protection film, a polarization film, a phase difference film, a near-infrared cut film, an optical diffusion film, an antireflective film, a high reflective film, a half-penetration half reflective film, an ND filter, a dichroic filter, an electromagnetic wave shield film, a beam splitter, a filter for optical communication, a camera lens, a pick-up lens, a F-theta lens, a prism, and an optical record substrate such as MD, CD, and DVD. As medical application substrates, the cycloolefin addition polymer can be used as a package material for medical supplies, a sterile container, a syringe, a pipe, an inner tube, an ampoule. As the electronic and electrical parts, the copolymer can be used as containers, trays, carrier tapes, separation films, insulating materials of OA equipment, insulating-layer materials of a flexible printed circuit board, and the like.

This application is based on Japanese application serial No. 2006-276638, filed on Oct. 10, 2006, and incorporated herein by reference.

What is claimed is:

1. A process for manufacturing a cycloolefin addition polymer, comprising:

initiating polymerization with at most 80 wt % of a total amount of a monomer composition comprising at least one cycloolefin compound represented by formula (1):

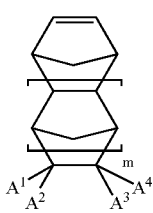

wherein $A^1$ to $A^4$ each, independently, represent a hydrogen atom, a hydrocarbon group having 1 to 20 carbon atoms, a hydrocarbon group containing an oxygen atom or a nitrogen atom and having 1 to 20 carbon atoms, a trialkylsilyl group having 3 to 12 carbon atoms, or a hydrolyzable silyl group having 0 to 12 carbon atoms, and m is 0 or 1, in the presence of a catalyst comprising at least one of a nickel compound or a palladium compound and at least one molecular weight controlling agent, and then adding the remaining amount of the monomer composition during the polymerization.

2. The process of claim 1, wherein the polymerization reaction is a continuous polymerization reaction and the conversion rate is 97% or more.

3. The process of claim 1, wherein the molecular weight controlling agent is a 1-alkene compound.

4. The process of claim 1, wherein the monomer composition comprises at least one compound selected from the group consisting of bicyclo[2.2.1]hept-2-ene and 5-alkylbicyclo[2.2.1]hept-2-enes having an alkyl group with 1 to 12 carbon atoms in an amount of 90 mol % or more.

5. The process of claim 1, wherein the monomer composition comprises at least one compound selected from the group consisting of 5-butylbicyclo[2.2.1]hept-2-ene, 5-hexylbicyclo[2.2.1]hept-2-ene, 5-octylbicyclo[2.2.1]hept-2-ene, and 5-decylbicyclo[2.2.1]hept-2-ene.

6. The process of claim 1, wherein the catalyst contains (a), (b), and (d) or the catalyst contains (c) and (d):

(a) an organic acid salt of palladium or a beta-diketonate compound of palladium, (b) a phosphine compound represented by formula (b),

(b)

wherein $R^1$ represents a group selected from a cyclopentyl group, a cyclohexyl group, and an isopropyl group, and $R^2$ represents a hydrocarbon group having 3 to 10 carbon atoms, (c) a phosphine complex of divalent palladium shown by the following formula (c),

(c)

wherein $R^1$ represents a group selected from a cyclopentyl group, a cyclohexyl group, and an isopropyl group, and $R^2$ represents a hydrocarbon group having 3 to 10 carbon atoms, X is an organic anion or a beta-diketonate anion, and n is 1 or 2, and (d) an ionic boron compound.

7. The process of claim 6, wherein (b) is tricyclopentyl phosphine or tricyclohexyl phosphine.

8. The process of claim 6, wherein the phosphine complex of divalent palladium (c) is a complex of palladium and tricyclopentylphosphine or a complex of palladium and tricyclohexylphosphine.

9. The process of claim 6, wherein the ionic boron compound (d) is a compound consisting of a carbenium cation and a tetrakis(pentafluorophenyl) borate anion or a tetrakis(perfluoroalkylphenyl) borate anion.

10. The process of claim 1, wherein the polymerization is initiated with 20 to 80 wt % of the total amount of the monomer composition.

11. The process of claim 1, wherein the polymerization is initiated with 30 to 75 wt % of the total amount of the monomer composition.

12. The process of claim 1, wherein the polymerization is initiated with 20 to 70 wt % of the total amount of the monomer composition.

13. The process of claim 1, wherein the cycloolefin addition polymer has a polystyrene-reduced number average number average molecular weight (Mn) of 20,000 to 200,000.

14. The process of claim 1, wherein the cycloolefin addition polymer has a ratio Mw/Mn of 4.3 or less.

15. The process of claim 1, wherein the cycloolefin addition polymer has a ratio Mw/Mn of 4.0 or less.

16. The process of claim 1, wherein the cycloolefin addition polymer has a ratio Mw/Mn of 3.5 or less.

17. The process of claim 1, wherein the cycloolefin addition polymer has a luminous transmission measured using a film with a thickness of 100 micrometers of 85% or more.

18. The process of claim 1, wherein the cycloolefin addition polymer has a haze value normally of 2.0% or less.

19. The process of claim 1, wherein the amount of the molecular weight controlling agent is 0.001 to 0.5 mol per one mol of the monomers used.

20. The process of claim 1, wherein the monomer composition comprises at least two different monomers, wherein at least one monomer comprises at least 20 wt % of the monomer composition, and wherein a portion of each monomer that comprises at least 20 wt % of the monomer composition is used in the initiation of the polymerization and the remaining portion is added during the polymerization.

21. The process of claim 1, wherein the monomer composition comprises at least two different monomers, wherein at least one monomer comprises at least 10 wt % of the monomer composition, and wherein a portion of each monomer that comprises at least 10 wt % of the monomer composition is used in the initiation of the polymerization and the remaining portion is added during the polymerization.

22. The process of claim 1, wherein the monomer composition comprises at least two different monomers, wherein at least one monomer comprises at least 5 wt % of the monomer composition, and wherein a portion of each monomer that comprises at least 5 wt % of the monomer composition is used in the initiation of the polymerization and the remaining portion is added during the polymerization.

23. The process of claim 1, wherein the monomer composition comprises at least two different monomers, wherein at least two monomers each comprise at least 20 wt % of the monomer composition, and wherein a portion of each monomer that comprises at least 20 wt % of the monomer composition is used in the initiation of the polymerization and the remaining portion is added during the polymerization.

24. A method of producing optical materials, electrical and electronic parts, medical application substrates, comprising manufacturing a cycloolefin addition polymer according to claim 1 and incorporating the cycloolefin addition polymer into an optical material, electrical part, electronic parts or medical application substrates.

* * * * *